(12) United States Patent
Viorel et al.

(10) Patent No.: US 11,589,312 B2
(45) Date of Patent: Feb. 21, 2023

(54) METHODS AND DEVICES FOR DETECTING A CHANNEL OCCUPANCY TIME DECLARED BY AN INTERFERING DEVICE IN A WIRELESS COMMUNICATION SYSTEM

(71) Applicant: CABLE TELEVISION LABORATORIES, INC., Louisville, CO (US)

(72) Inventors: Dorin Gheorghe Viorel, Erie, CO (US); Balkan Kecicioglu, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/363,879

(22) Filed: Mar. 25, 2019

(65) Prior Publication Data

US 2020/0163022 A1  May 21, 2020

Related U.S. Application Data

(60) Provisional application No. 62/774,550, filed on Dec. 3, 2018, provisional application No. 62/769,701, filed on Nov. 20, 2018.

(51) Int. Cl.
| | |
|---|---|
| *H04W 4/00* | (2018.01) |
| *H04W 52/02* | (2009.01) |
| *H04W 88/02* | (2009.01) |
| *H04W 16/14* | (2009.01) |
| *H04W 74/08* | (2009.01) |

(52) U.S. Cl.
CPC ....... *H04W 52/0238* (2013.01); *H04W 16/14* (2013.01); *H04W 52/0229* (2013.01); *H04W 74/0808* (2013.01); *H04W 88/02* (2013.01)

(58) Field of Classification Search
CPC .. H04W 72/042; H04W 76/27; H04L 5/0053; H04L 5/0007; H04L 5/0048
See application file for complete search history.

(56) References Cited

U.S. PATENT DOCUMENTS

| | | | |
|---|---|---|---|
| 2008/0045145 A1* | 2/2008 | Nakatsugawa | H04B 7/155 455/11.1 |
| 2010/0190447 A1* | 7/2010 | Agrawal | H04W 48/08 714/748 |
| 2011/0096671 A1* | 4/2011 | Lindstrom | H04W 76/18 370/242 |

(Continued)

*Primary Examiner* — Atique Ahmed
(74) *Attorney, Agent, or Firm* — PdZ Patent Law, PLLC (57) ABSTRACT

A method for detecting a channel occupancy time declared by an interfering device in a wireless communication system includes (a) receiving a first radio frequency (RF) transmission from a base station at a user equipment (UE) device, (b) detecting failure to receive a second RF transmission from the base station at the UE device, and (c) in response to detecting the failure to receive the second RF transmission from the base station, causing the UE device to operate in a sleep mode. Another method for detecting a channel occupancy time declared by an interfering device in a wireless communication system includes (a) receiving a first RF transmission from a base station at a UE device, (b) detecting, at the UE device, an interfering RF transmission, and (c) in response to detecting the interfering RF transmission, causing the UE device to operate in a sleep mode.

20 Claims, 10 Drawing Sheets

(56) References Cited

U.S. PATENT DOCUMENTS

| | | | | |
|---|---|---|---|---|
| 2011/0183663 A1* | 7/2011 | Kenehan | ............... | H04W 76/28 |
| | | | | 455/423 |
| 2012/0207040 A1* | 8/2012 | Comsa | .............. | H04W 72/1215 |
| | | | | 370/252 |
| 2013/0215809 A1* | 8/2013 | Chang | ................... | H04W 76/28 |
| | | | | 370/311 |
| 2015/0009879 A1* | 1/2015 | Kim | ...................... | H04W 74/06 |
| | | | | 370/311 |
| 2015/0358923 A1* | 12/2015 | Teng | ................ | H04W 52/0254 |
| | | | | 455/522 |
| 2016/0219585 A1* | 7/2016 | Khay-Ibbat | ....... | H04W 36/0022 |
| 2017/0048854 A1* | 2/2017 | Anand | .............. | H04W 72/0453 |
| 2018/0027495 A1* | 1/2018 | Song | .................... | G06F 1/3206 |
| | | | | 455/343.2 |
| 2018/0132292 A1* | 5/2018 | Yang | ..................... | H04W 76/18 |
| 2018/0220345 A1* | 8/2018 | Moon | .................... | H04B 7/088 |
| 2018/0279274 A1* | 9/2018 | Sun | ........................ | H04L 1/1864 |
| 2018/0368142 A1* | 12/2018 | Liou | ................. | H04W 74/0808 |
| 2019/0364492 A1* | 11/2019 | Azizi | ................ | H04W 68/005 |
| 2020/0037242 A1* | 1/2020 | Yilmaz | ............ | H04W 52/0216 |
| 2021/0014927 A1* | 1/2021 | Tang | ................ | H04W 52/0235 |

\* cited by examiner

METHODS AND DEVICES FOR DETECTING A CHANNEL OCCUPANCY TIME DECLARED BY AN INTERFERING DEVICE IN A WIRELESS COMMUNICATION SYSTEM

RELATED APPLICATIONS

This application claims benefit of priority to (a) U.S. Provisional Patent Application Ser. No. 62/769,701, filed Nov. 20, 2018 and (b) U.S. Provisional Patent Application Ser. No. 62/774,550, filed Dec. 3, 2018. Both of the aforementioned applications are incorporated herein by reference.

BACKGROUND

Radio frequency (RF) spectra may be grouped into licensed spectra and unlicensed spectra. Licensed spectra require permission for use, such as permission for use from a government authority. Unlicensed spectra typically do not require permission for use, although use of unlicensed spectra may be conditioned on following certain rules. An example of licensed spectra includes spectra licensed by government authorities to mobile, portable or fixed applications. An use case example for unlicensed spectra is represented by Wi-Fi devices operating in these spectra. Some communication systems operate solely with licensed spectra, some communication systems operate solely with unlicensed spectra. Additionally, some communication systems are capable of operating with both licensed spectra and unlicensed spectra, such to help achieve large communication bandwidth.

DETAILED DESCRIPTION OF THE EMBODIMENTS

Two or more wireless communication systems may share common RF spectrum. For example, two wireless communication systems sharing the same type of wireless access protocol, e.g., two Wi-Fi wireless communication systems, may share the same unlicensed spectrum. As another example, two wireless communication systems employing different wireless access protocols, e.g., a fifth-generation (5G) new radio (NR) wireless communication system and a Wi-Fi wireless communication system, may share common unlicensed spectrum. Multiple wireless communication systems sharing common RF spectrum must operate such that the wireless communication systems do not interfere with each other, or at least such that any interference caused by one of the coexistent systems does not degrade significantly the quality of service of the other coexistent communication systems.

Disclosed herein are methods, devices and systems for optimizing the coexistence of wireless communication devices using different or common access technologies sharing the same spectrum. The access technologies include, for example, Wi-Fi and/or 5G access technologies. In particular embodiments, a Wi-Fi device in a wireless communication system is configured to take over air interface resources, e.g., by declaring a channel occupancy time (COT), after checking that the air interface is not used by another device. In some embodiments, a UE device receiving and detecting a COT signaled by a first Wi-Fi device may respond to the detected COT by operating in a sleep mode. Under these conditions, the target UE device can receive the related base station control channels/signals with a degraded capability or can no longer receive the base station's downlink channels/signals due to the first Wi-Fi device's interference. In some embodiments, a base station is configured to detect interference over the air, e.g., from a second Wi-Fi device, and in response, the base station stops transmitting downlink control and signal channels. In certain embodiments, failure of a UE device to receive downlink control signals may indicate that an associated base station has detected an interfering RF transmission and has therefore stopped transmitting downlink channels. For example, the base station may have detected a COT signaled by the second Wi-Fi device, e.g., from a Wi-Fi preamble transmitted by the second Wi-Fi device. In such a case, the UE device may be configured to operate in a sleep mode until the base station wakes up. Operating the UE device in a sleep mode in response to detecting an interfering RF transmission minimizes power consumption of the UE device, thus maximizing the battery life of that device.

Figure 1:
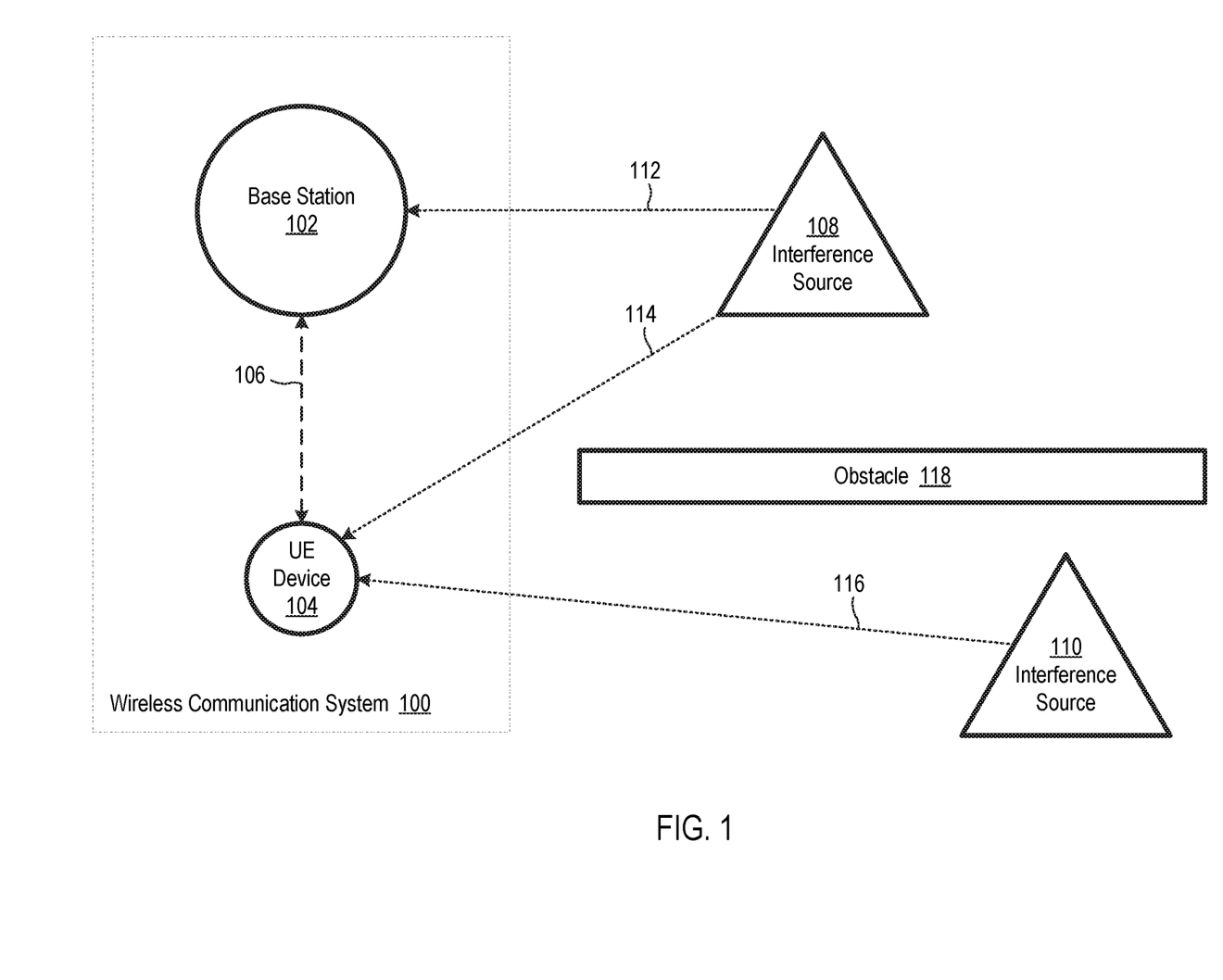
FIG. 1 is a schematic diagram illustrating a wireless communication system operating near interference sources, according to an embodiment.

FIG. 1 is a schematic diagram illustrating a wireless communication system 100, which is one embodiment of the new systems disclosed herein. Wireless communication system 100 includes a base station 102 and a UE device 104. Base station 102 communicates with UE device 104 via RF signals 106. In some embodiments, RF signals 106 are within unlicensed RF spectrum, e.g., RF spectrum that is shared by wireless communication system 100 and one or more other devices or systems, e.g., interference sources 108 and 110 (discussed below). Examples of base station 102 include, but are not limited to, a long-term evolution (LTE) base station (e.g., an eNB device), a NR base station (e.g., a gNB device), and variations and/or extensions thereof. Examples of UE device 104 include, but are not limited to, a computer, a set-top device, a data storage device, an Internet of Things (IoT) device, an entertainment device, a wireless access point, a computer networking device, a mobile telephone, a smartwatch, a wearable device with wireless capability, and a medical device using the same spectrum and RF access protocols as base station 102. In some embodiments, each of base station 102 and UE device 104 operate according to a NR protocol, e.g., a New Radio-Unlicensed (NR-U) protocol. The number of base stations 102 and the number of UE devices 104 may vary without departing from the scope hereof. For example, wireless communication system 100 may include additional base stations 102, such as to extend coverage over a larger geographical area. As another example, wireless communication system 100 may include additional UE devices 104.

Figure 2:
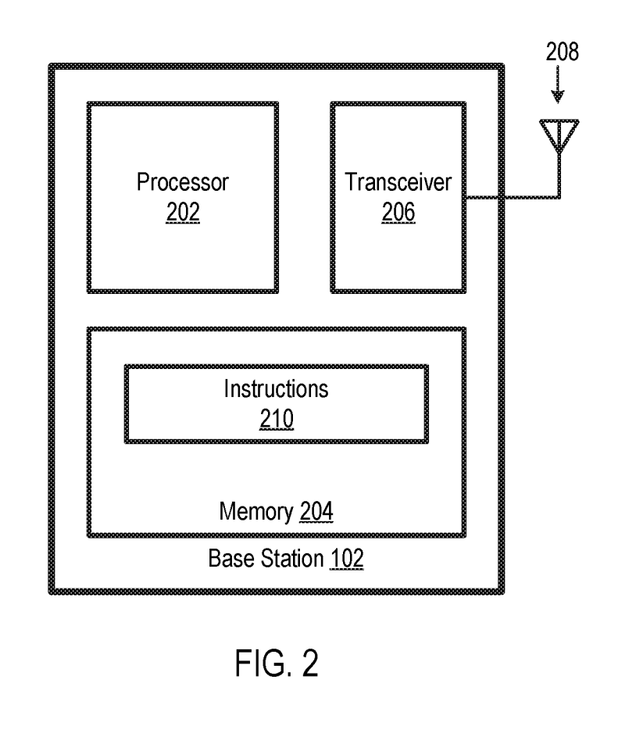
FIG. 2 is a block diagram illustrating a base station (BS), according to an embodiment.

FIG. 2 is a schematic diagram of base station 102. Base station 102 includes a processor 202, a memory 204, a transceiver 206, and an antenna 208. Processor 202 is configured to execute instructions 210 stored in memory 204 to control base station 102. Transceiver 206 is connected to antenna 208. Transceiver 206 interfaces antenna 208 with the base band section of base station 102. For example, in some embodiments, transceiver 206 converts electrical signals generated by processor 202 into RF signals for transmission to UE device 104 via antenna 208, and transceiver 206 converts RF signals received from UE device 104 via antenna 208 into electrical signals to be further processed by processor 202. One or more elements of base station 102 may include multiple sub-elements. For example, processor 202 could include a plurality of co-processors or multiple processors operating in parallel, memory 204 could include a plurality of memory modules, and antenna 208 could include multiple radiating/receiving elements. Additionally, processor 202 and memory 204 could be replaced with other circuitry, e.g. analog and/or digital base band and power management electronic circuitry, performing similar functions to processor 202 and memory 204. Furthermore, although base station 102 is illustrated as being a self-contained device, two or more elements of base station 102 could be distributed among multiple locations. For example, processor 202 and memory 204 could be located at a different location than transceiver 206 and antenna 208. Moreover, multiple instances of base station 102 could share one or more elements without departing from the scope hereof.

Figure 3:
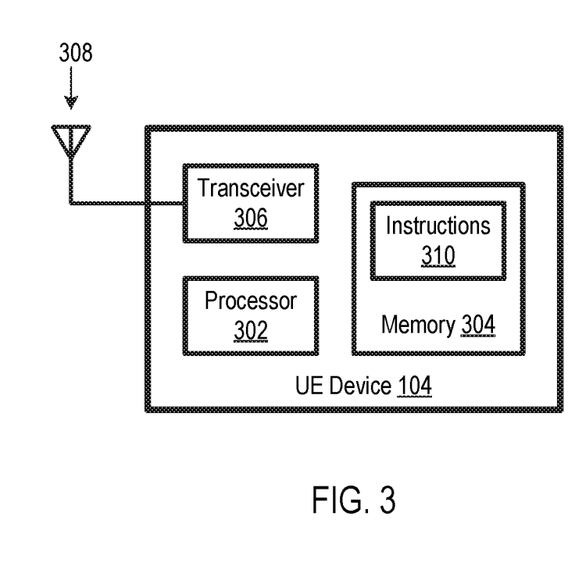
FIG. 3 is a block diagram illustrating a user equipment (UE) device, according to an embodiment.

FIG. 3 is a schematic diagram of UE device 104. UE device 104 includes a processor 302, a memory 304, a transceiver 306, and an antenna 308. Processor 302 is configured to execute instructions 310 stored in memory 304 to control UE device 104. Transceiver 306 is connected to antenna 308, and transceiver 306 interfaces antenna 308 with other components of UE device 104. For example, in some embodiments, transceiver 306 converts electrical signals generated by processor 302 into RF signals for transmission to base station 102 via antenna 308, and transceiver 306 converts RF signals received from base station 102 via antenna 308 into electrical signals for processor 302. Processor 302 and memory 304 could be replaced with other circuitry, e.g. analog and/or digital electronic circuitry, performing similar functions to processor 302 and memory 304. One or more elements of UE device 104 may include multiple sub-elements. For example, processor 302 could include a plurality of co-processors or multiple processors operating in parallel, memory 304 could include a plurality of memory modules, and antenna 308 could include multiple radiating/receiving elements.

Referring again to FIG. 1, wireless communication system 100 operates at least occasionally in an interference environment. In one embodiment, the interference could be generated by interference sources 108 and 110. Each interference source 108 and 110 is another wireless node using either the same access protocol as wireless communication system 100 or a different access protocol than wireless communication system 100. For example, interference sources 108 and 110 may each be a base station, a wireless access point, or a UE device. Base station 102, UE device 104, interference source 108, and interference source 110 share common RF spectrum, e.g., unlicensed RF spectrum, but interference sources 108 and 110 are not part of wireless communication system 100. In some embodiments, interference sources 108 and 110 are part of a wireless communication system separate from wireless communication system 100. For example, in some embodiments, wireless communication system 100 is a 5G NR wireless communication system, and interference sources 108 and 110 are part of a Wi-Fi wireless communication system. As another example, in some embodiments, wireless communication system 100 is a 5G NR wireless communication system, and interference sources 108 and 110 are part of a 5G NR wireless communication system separate from wireless communication system 100. In another example, in some embodiments, wireless communication system 100 is a 5G NR wireless communication system, and interference sources 108 and 110 are part of a licensed assisted access (LAA) LTE wireless communication system.

Interference source 108 generates one or more interfering RF transmissions 112 and 114, which are received by base station 102 and UE device 104, respectively. Interfering RF transmissions 112 and 114 are within the same RF spectrum as RF signals 106, and interfering RF transmissions 112 and 114 therefore potentially interfere with operation of wireless communication system 100. Interference source 110 generates an interfering RF transmission 116 which is received by UE device 104. However, base station 102 does not receive interfering RF transmission 116, such as due to presence of an obstacle 118 between interference source 110 and base station 102. Thus, interference source 110 is hidden with respect to base station 102. Interfering RF transmission 116 is within the same RF spectrum as RF signals 106, and interfering RF transmission 116 therefore potentially interferes with the operation of wireless communication system 100.

The number and configuration of interference sources near wireless communication system 100 may vary. For example, either of interference sources 108 or 110 may be absent and/or additional interference sources may be present. As another example, obstacle 118 may be removed or moved so that an interfering RF transmission generated by interference source 110 is received by base station 102. As yet another example, obstacle 118 may be moved to block interfering RF transmission 114, so that UE device 104 does not receive interfering RF transmission 114.

Figure 4:
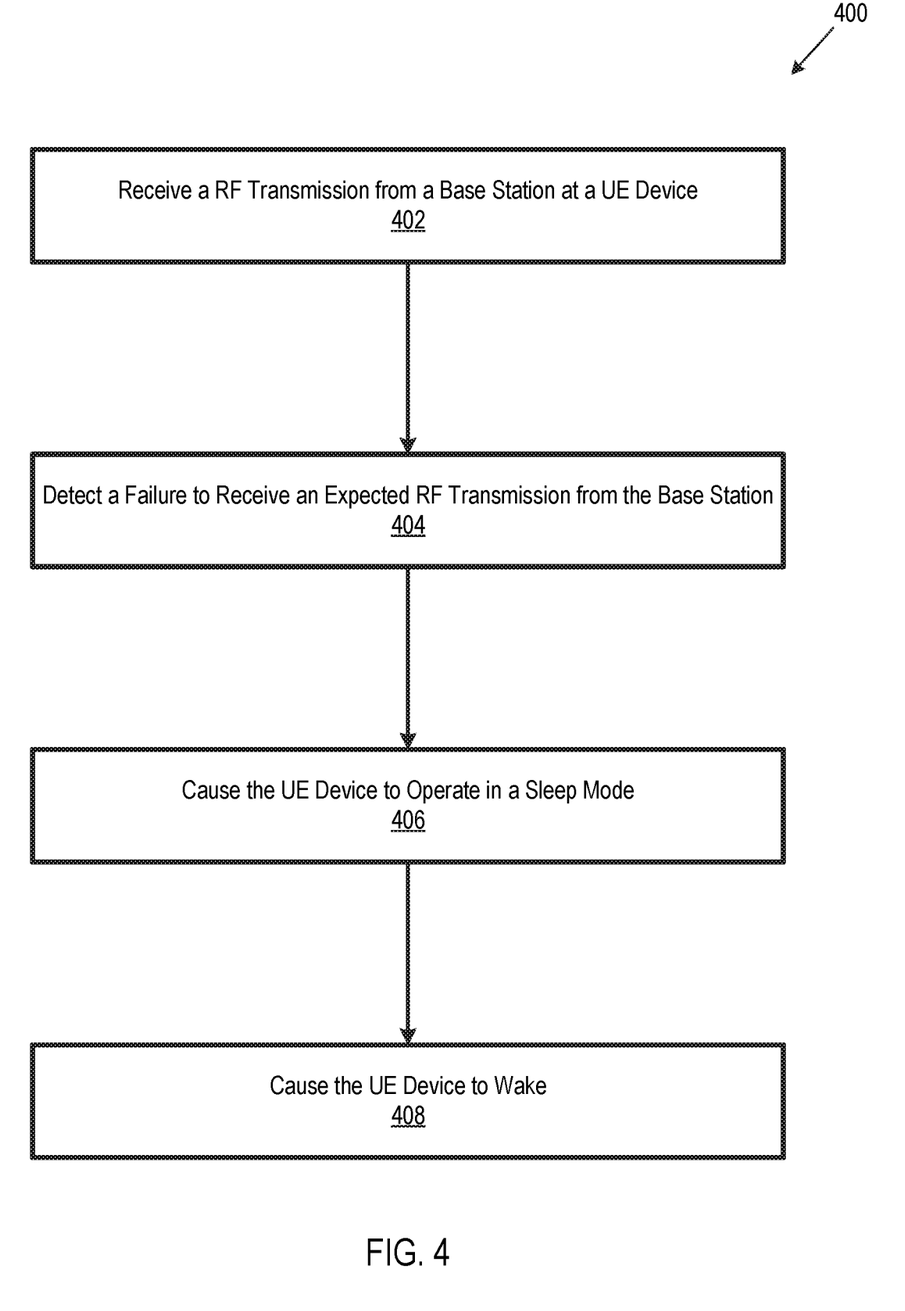
FIG. 4 is a flow chart illustrating a method for detecting a channel occupancy time triggered by an interfering device in a wireless communication system, according to an embodiment.
Figure 5:
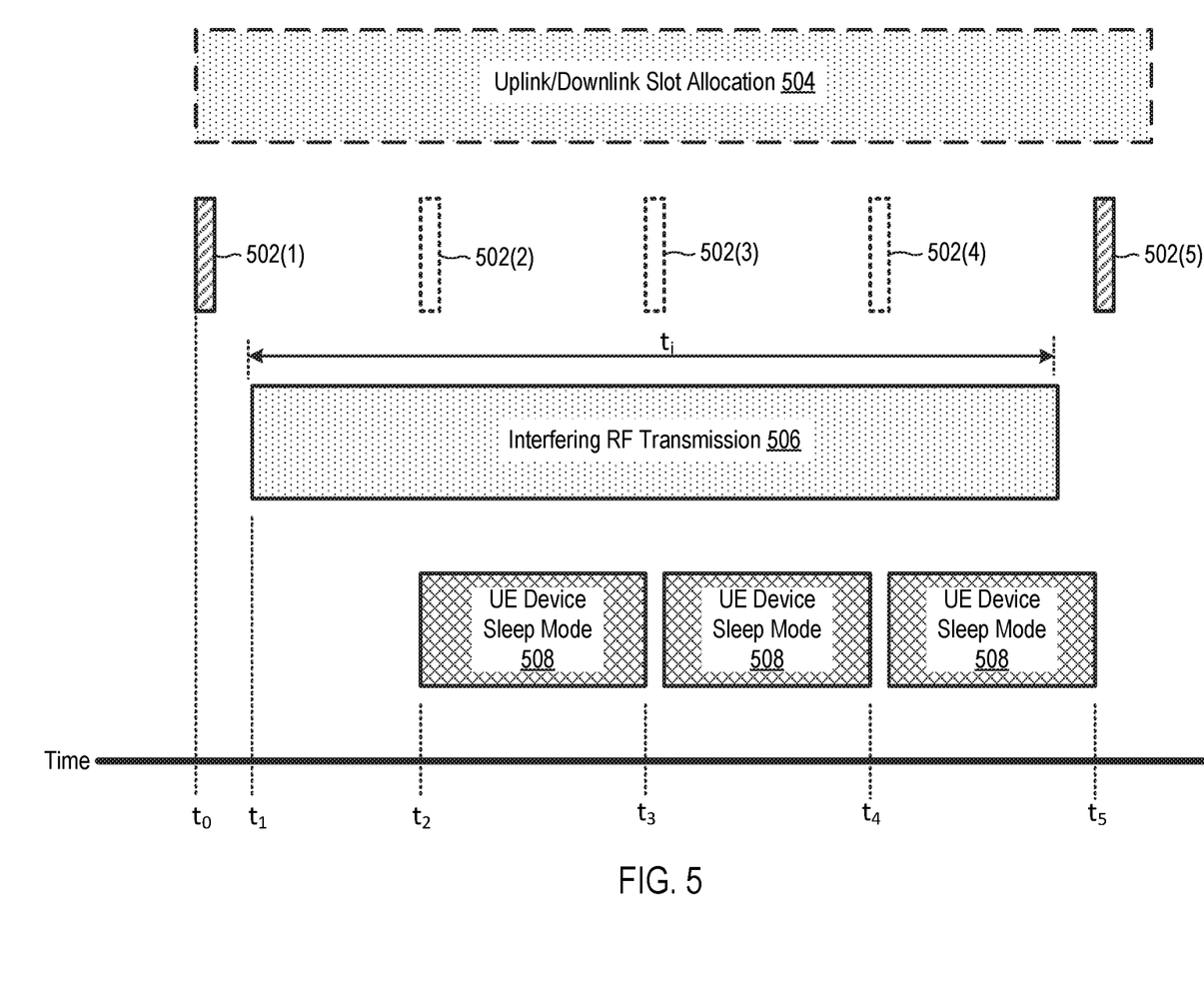
FIG. 5 is a timing diagram illustrating one example of the method of FIG. 4.

In some embodiments, UE device 104 is configured to execute method 400 of FIG. 4 for detecting a channel occupancy time originated by an interfering device in a wireless communication system, thereby helping minimize interference among wireless communication devices, e.g., interference between base station 102 and interference source 108 and/or an interference between UE device 104 and interference source 108. For example, in some embodiments, processor 302 of UE device 104 executes instructions 310 stored in memory 304 of UE device 104 to execute method 400. FIG. 5 is a timing diagram illustrating one example of method 400. FIGS. 4 and 5 are best viewed together in the following discussion.

In block 402, UE device 104 receives a RF transmission from base station 102. In one example of block 402, processor 302 executes instructions 310 to receive a RF transmission 502(1) via antenna 308 and transceiver 306. UE device 104 receives RF transmission 502(1) at time t0, as illustrated in FIG. 5. In this document, specific instances of an item may be referred to by use of a numeral in parentheses (e.g., RF transmission 502(1)) while numerals without parentheses refer to any such item (e.g., RF transmissions 502). In some embodiments where wireless communication system 100 operates according to a 5G NR protocol, RF transmissions 502 include at least one of a 5G NR Physical Downlink Shared Channel (PDSCh) and a 5G NR Physical Downlink Control Channel (PDCCh) during an uplink or downlink slot allocation 504 of base station 102. In this document, a "slot" refers to a data structure including a predetermined number of data symbols. For example, in some embodiments where wireless communication system 100 operates according to a NR PHY protocol, a slot consists of 14 data symbols.

In block 404, UE device 104 detects a failure to receive an expected RF transmission from base station 102. In one embodiment, UE device 104 expects to receive RF transmissions periodically, such as based on a known PDCCh control channel. In one example of block 404, processor 302 executes instructions 310 to detect expected RF transmission 502(2) at time $t_2$. In the example of FIG. 5, UE device 104 expects to receive RF transmissions 502 on a periodic basis, i.e., at times $t_1$, $t_2$, $t_3$, $t_4$, $t_5$, and so on. However, base station 102 does not transmit expected RF transmissions 502(2), 502(3), and 502(4) because base station 102 detected an interfering RF transmission 506 at time $t_1$, following an interference source declaring a COT. Thus, failure of UE device 104 to receive control signal 502(2) corresponds to an indirect detection of interfering RF transmission 506 by base station 102. UE device 104 does not necessarily detect interfering RF transmission 506, such that the interference source generating interfering RF transmission 506 is hidden with respect to UE device 104. RF transmissions 502(2), 502(3), and 502(4) are depicted with dashed lines in FIG. 5 to denote that UE device 104 fails to receive these expected RF transmissions.

In some embodiments, interfering RF transmission 506 is interfering RF transmission 112 generated by interference source 108. For example, interference source 108 may declare a COT corresponding to an expected transmission length $t_i$ of interfering RF transmission 506. In certain embodiments, interfering RF transmission 506 is a Wi-Fi signal, transmitted during the COT, and base station 102 is configured to detect an Institute of Electrical and Electronics Engineers (IEEE) 802.11 preamble positioned at the beginning of the interfering RF transmission 506 burst, to determine expected length $t_i$. In some embodiment, base station 102 uses the detection of an 802.11a preamble to determine length and in some other embodiment, base station 102 uses an 802.11ax preamble to determine length $t_i$. In some other embodiments, interfering RF transmission 506 is signal from a 5G New Radio-Unlicensed (NR-U) wireless communication system separate from wireless communication system 100, and base station 102 is optionally configured to detect a NR-U preamble positioned at the beginning of the interfering RF transmission 506 burst, to determine expected length $t_i$.

UE device 104 interprets failure to receive the expected RF transmission in block 404 as an indication that base station 102 is subject to interference. Accordingly, in block 406, UE device 104 declares a sleep mode in response to failure to detect the expected RF transmissions from base station 102. In one example of block 406, processor 302 executes instructions 310 to cause UE device 104 to operate in a sleep mode 508 in response to failure to detect expected RF transmission 502(2) from base station 102 at time $t_2$. In some embodiments, UE device 104 operates at a lower power state in the sleep mode than in a normal operating mode.

In block 408 of FIG. 4, UE device 104 is caused to wake up, i.e. change from the sleep mode to a different operating mode, e.g., in response to detecting a RF transmission (e.g., PDCCh or PDSCh) from base station 102 and/or in response to end of an expected COT of an interference source. In the example illustrated in FIG. 5, UE device 104 operates in a "punctured" sleep mode 508 in response to failure to detect expected RF transmission 502(2) from base station 102. The punctured sleep mode 508 is characterized by UE device 104 periodically waking, i.e., periodically changing from the sleep mode to a different operating mode where UE device 104 can receive a RF transmission (e.g., PDCCh or PDSCh) from base station 102. UE device 104 returns to the sleep mode after waking if UE device 104 does not receive a RF transmission 502 while awake. In the example of FIG. 5, UE device 104 momentarily wakes from sleep mode 508 at times $t_3$, $t_4$, and $t_5$ when UE device 104 expects to receive a RF transmission 502. UE device 104 does not detect a RF transmission 502 at times $t_3$ and $t_4$, and UE device 104 therefore returns to sleep mode 508. In contrast, UE device 104 detects a RF transmission 502(5) when waking at time $t_5$, and UE device 104 therefore wakes, i.e., changes from sleep mode 508 to a different operating mode, in response to detecting RF transmission 502(5).

Operating UE device 104 in the sleep mode in response to failure to detect the expected RF transmission in block 404 optimizes the power consumption of UE device 104, therefore improving the battery life of the UE device. Additionally, operating UE device 104 in the sleep mode in response to failure to detect the expected RF transmission advantageously helps avoid contention conflicts between UE device 104 and the device generating interfering signal 504.

Figure 6:
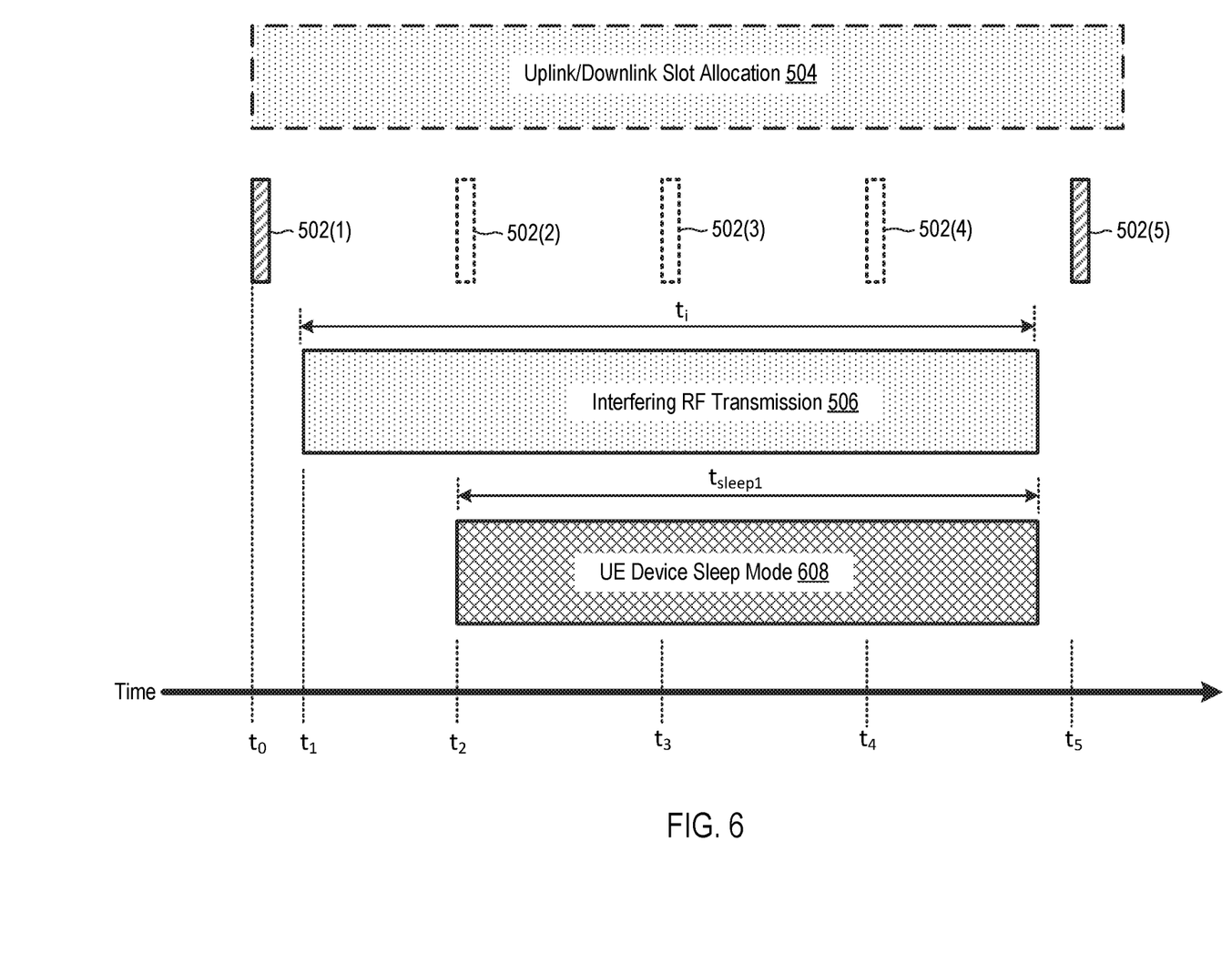
FIG. 6 is a timing diagram illustrating another example of the method of FIG. 4.

FIG. 6 illustrates an alternate embodiment of method 400 where UE device 104 wakes in response to the completion of a detected COT signaled by an interference source. In this embodiment, UE device 104 is configured to operate in a sleep mode, instead of in a punctured sleep mode, in response to failure to detect an expected control signal in block 404 and after detecting a high level Receive Signal Level (RSL) measured on the preamble generated by the interference source. In particular, FIG. 6 is a timing diagram illustrating one example of method 400 in an alternate embodiment where UE device 104 operates in a continuous sleep mode for a time duration $t_{sleep1}$, after failing to detect expected RF transmission 502(2) at time $t_2$. In some embodiments, time duration $t_{sleep1}$ is determined according to an expected operating environment of UE device 104, by the preamble generated by the interference source and comprising the COT information. For example, if UE device 104 could operate near Wi-Fi interference sources, time duration $t_{sleep1}$ may be chosen to correspond to an expected Wi-Fi COT. In some other embodiments, UE device 104 is configured to dynamically determine time duration $t_{sleep1}$ according to an operating environment of UE device 104. For example, if UE device 104 detects Wi-Fi interfering signals, UE device 104 may set time duration $t_{sleep1}$ to correspond to an expected Wi-Fi COT, and if UE device 104 instead detects 5G interfering signals, UE device 104 may set time duration $t_{sleep1}$ to correspond to an expected NR COT.

Figure 7:
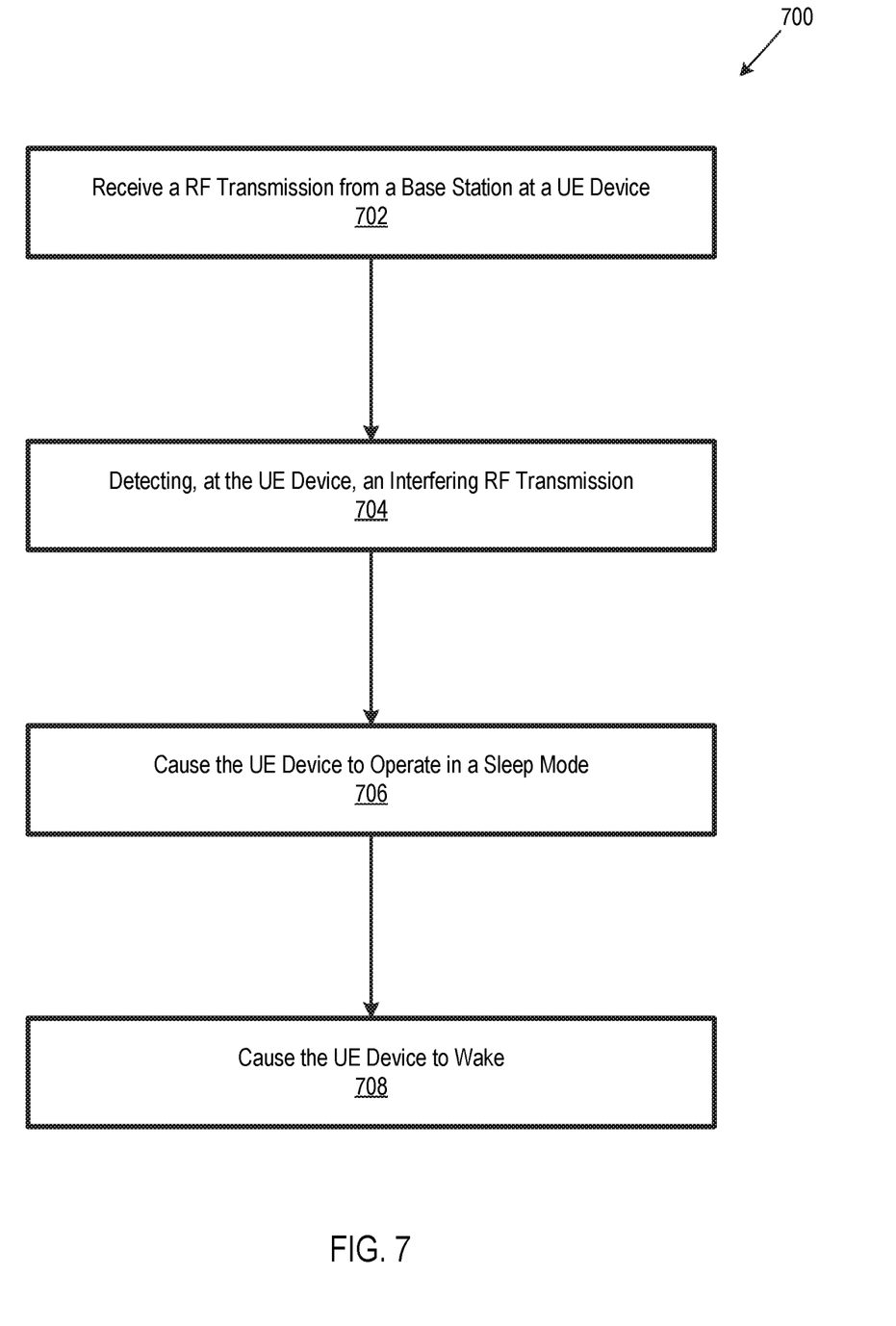
FIG. 7 is a flow chart illustrating another method for detecting a channel occupancy time originated by an interfering device in a wireless communication system, according to an embodiment.
Figure 8:
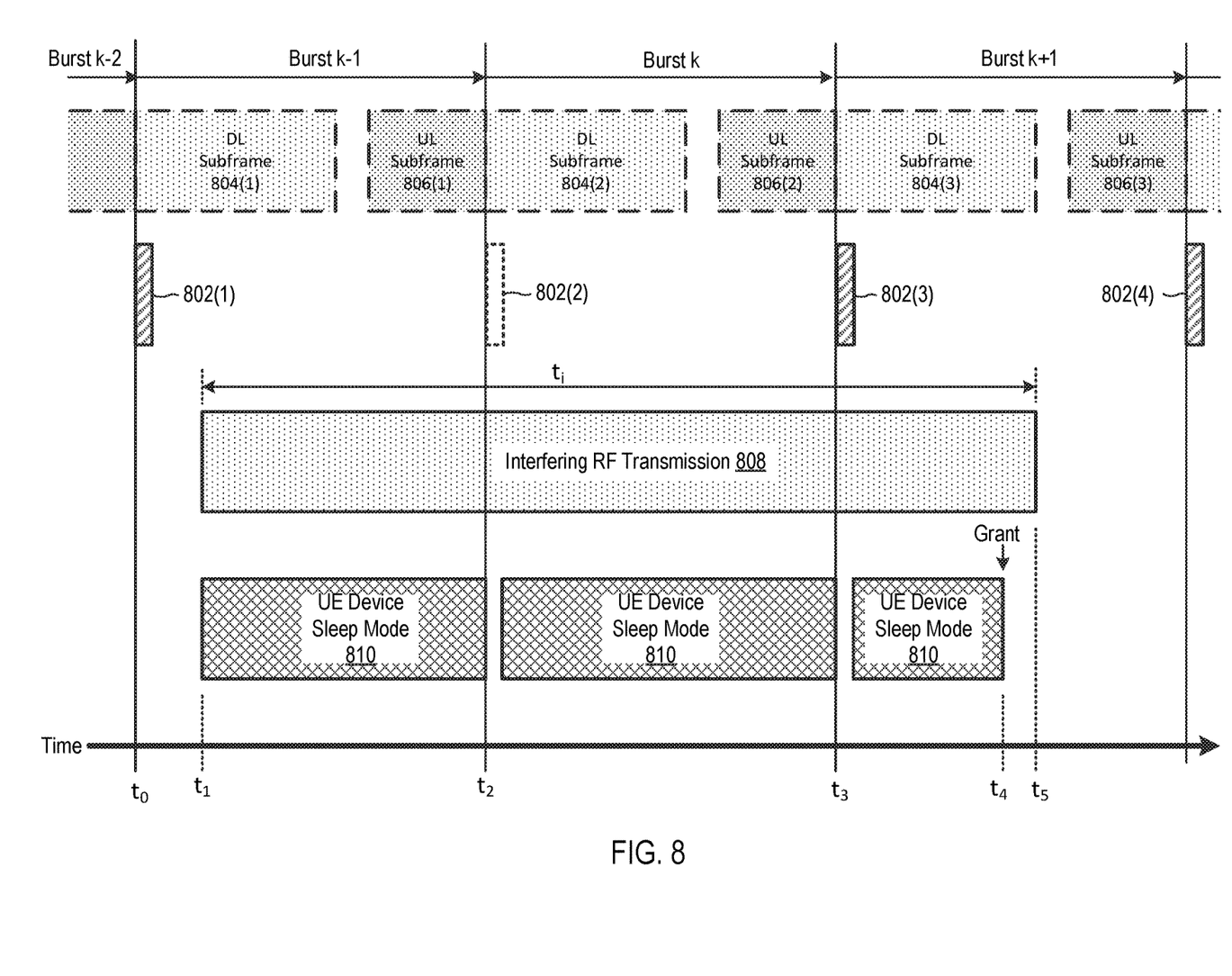
FIG. 8 is a timing diagram illustrating one example of the method of FIG. 7.

In some embodiments, UE device 104 is configured to execute method 700 of FIG. 7, in place of method 400 or in addition to method 400, thereby minimizing interference among wireless communication devices, e.g., interference between UE device 104 and interference source 110. For example, in some embodiments, processor 302 of UE device 104 executes instructions 310 stored in memory 304 of UE device 104 to execute method 700. FIG. 8 is a timing diagram illustrating one example of method 700. FIGS. 7 and 8 are best viewed together in the following discussion.

In block 702, UE device 104 receives a RF transmission from base station 102. In one example of block 702, processor 302 executes instructions 310 to receive a RF transmission 802(1) via antenna 308 and transceiver 306. UE device 104 receives RF transmission 802(1) at time to in a burst k-1, as illustrated in FIG. 8. In some embodiments where wireless communication system 100 operates according to a 5G NR protocol, RF transmissions 802 include at least one of a PDCCh and a PDSCh during a downlink slot allocation 804 of base station 102 or during an uplink slot allocation 806 of base station 102. In one embodiment, UE device 104 expects to receive RF transmissions 802 periodically, such a known demodulation reference signal (DMRS) structure.

In block 704, UE device 104 detects an interfering RF transmission. In one example of block 704, processor 302 executes instructions 310 to detect an interfering RF transmission 808 at time $t_1$ via antenna 308 and transceiver 306. In some embodiments, interfering RF transmission 808 is interfering RF transmission 116 generated by interference source 110 and is not detected by base station 102. In some other embodiments, interfering RF transmission 808 is interfering RF transmission 114 generated by interference source 108 and is detected by both UE device 104 and base station 102. For example, interference source 110 may declare a COT corresponding to an expected length $t_i$ of interfering RF transmission 808. In certain embodiments, interfering RF transmission 808 is a Wi-Fi signal, transmitted during the COT of interference source 110, and UE device 104 is configured to detect an IEEE 802.11 preamble, e.g., an 802.11a preamble or an 802.11ax preamble, to determine expected length $t_i$. In some other embodiments, interfering signal 808 is signal from a 5G NR-U wireless communication system separate from wireless communication system 100, and base station 102 is optionally configured to detect a NR-U preamble positioned at the beginning of the interfering RF transmission 808 burst, to determine expected length $t_i$.

In block 706, UE device 104 declares a sleep mode in response to detecting the interfering RF transmission in block 704. In one example of block 706, processor 302 executes instructions 310 to operate UE device 104 in a sleep mode 810 in response to detecting interfering RF transmission 808 at time $t_1$. Operating UE device 104 in the sleep mode in response to detecting interfering RF transmission 808 avoids the interference between UE device 104 and the device generating interfering RF transmission 808. Additionally, UE device 104 may be unable to receive control signals 802 due to presence of interfering RF transmission 808, and operating UE device 104 in sleep mode during presence of interfering RF transmission 808 may therefore optimize the power consumption of UE device 104 and thereby optimize the battery life of this device.

In some embodiments, UE device 104 notifies base station 102 of the interfering RF transmission detected in block 704, and/or that UE device 104 has entered a sleep mode in block 706. For example, in particular embodiments, UE device 104 transmits information to base station 102 notifying the base station that the UE device has detected an interfering RF transmission, as part of a 5G NR Physical Uplink Control Channel (PUCCh) or a 5G NR Physical Random Access Channel (PRACh) message transmitted just after UE device 104 receives a PDDCh from base station 102. As another example, in certain embodiments, UE device 104 transmits information to base station 102 notifying the base station that the UE device has entered into a sleep mode, e.g., a discontinuous reception/transmission mode, as part of a PUCCh or PRACh message transmitted just after UE device 104 receives a PDDCh from base station 102.

In block 708, UE device 104 is caused to wake, i.e. change from the sleep mode to a different operating mode, e.g., in response to detecting a RF transmission from base station 102 (e.g., a PDCCh or a PDSCh) and/or in response to end of an expected COT of an interference source. In the example illustrated in FIG. 8, UE device 104 operates in a punctured sleep mode 810 in response to detecting interfering RF transmission 808. The punctured sleep mode 810 is characterized by UE device 104 periodically waking, i.e., periodically changing from the sleep mode to a different operating mode where UE device 104 can detect a RF transmission signal 802 from base station 102. UE device 104 returns to the sleep mode after waking if UE device 104 does not receive a RF transmission 802 while awake. In the example of FIG. 8, UE device 104 momentarily wakes from sleep mode 810 at times $t_2$ and $t_3$ when UE device 104 expects to receive a RF transmission 802. Interfering RF transmission 808 prevents UE device 104 from receiving expected RF transmission 802(2) at time $t_2$, and UE device 104 therefore returns to sleep mode 810. RF transmission 802(2) is depicted with dashed lines in FIG. 8 to denote that UE device 104 failed to receive this expected RF transmission. UE device 104 successfully receives RF transmission 802(3) generated by base station 102, at time $t_3$ despite presence of interfering RF transmission 808. Accordingly, UE device 104 detects RF transmission 802(3) when waking at time $t_3$, and UE device 104 therefore wakes, i.e., changes from sleep mode 810 to a different operating mode, at a time $t_4$ corresponding to a grant, e.g. a downlink grant, received via RF transmission 802(3).

Figure 9:
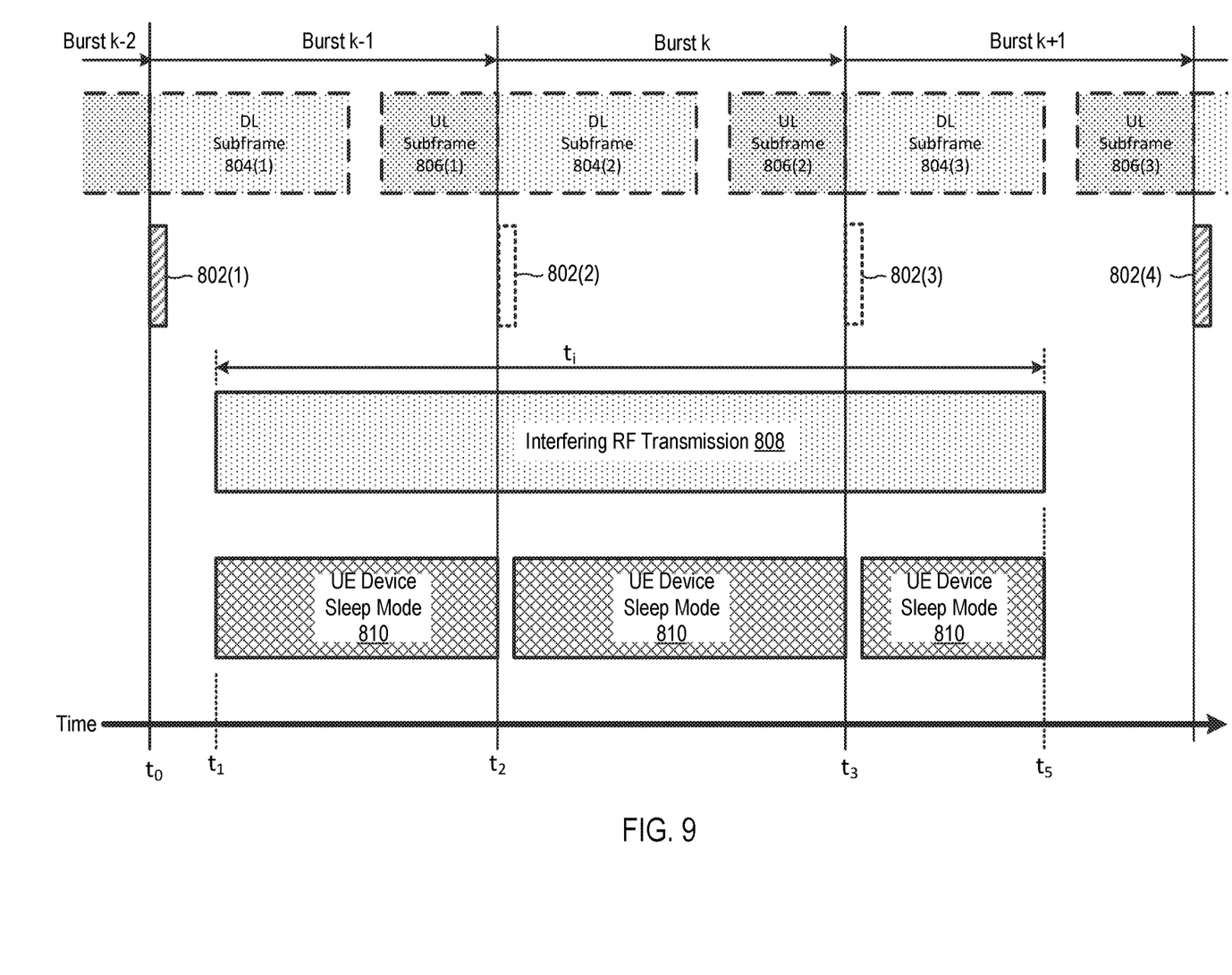
FIG. 9 is a timing diagram illustrating another example of the method of FIG. 7.

FIG. 9 illustrates another example of method 700. The example of FIG. 9 is similar to the example of FIG. 8, except that interfering RF transmission 808 prevents UE device 104 from receiving RF transmission 802(3) at time t3. Consequently, UE device 104 momentarily wakes at time t3 and then returns to sleep mode 810 due to its failure to detect RF transmission 802(3). In this example, UE device 104 wakes at time t5 which corresponds to an expected end of interfering RF transmission 808, e.g., an expected end of the COT of the device generating interfering signal 808. UE device 104 determines time t5, for example, from starting time t1 of interfering RF transmission 808 and expected length ti of interfering RF transmission 808.

Figure 10:
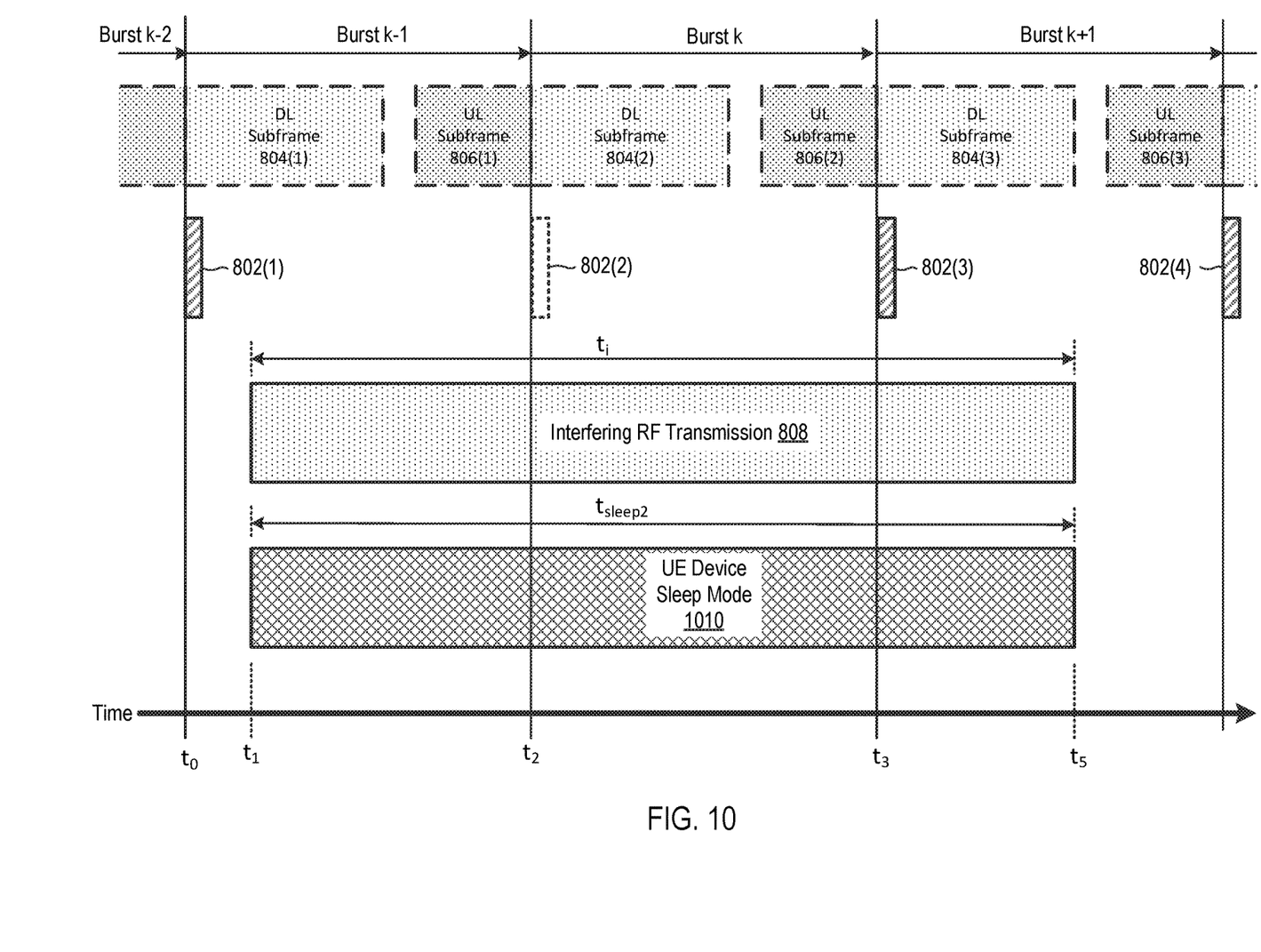
FIG. 10 is a timing diagram illustrating yet another example of the method of FIG. 7.

FIG. 10 illustrates an alternate embodiment of method 700 where UE device 104 wakes up following the completion of a detected COT of an interference source. In this embodiment, UE device 104 is configured to operate in a continuous sleep mode, instead of in a punctured sleep mode, in response to detecting the interfering RF transmission in block 704. In particular, FIG. 10 is a timing diagram illustrating one example of method 700 in an alternate embodiment where UE device 104 operates in a continuous sleep mode for a time duration $t_{sleep2}$, in response to detecting the COT information associated with interfering RF transmission 808 at time $t_1$. In some embodiments, time duration $t_{sleep2}$ is predetermined according to an expected operating environment of UE device 104. For example, if UE device 104 is expected to operate near Wi-Fi interference sources, time duration $t_{sleep2}$ may be chosen to correspond to a detected Wi-Fi COT. In some other embodiments, UE device 104 is configured to dynamically determine time duration $t_{sleep2}$ according to an operating environment of UE device 104. For example, if UE device 104 detects Wi-Fi interfering signals, UE device 104 may set time duration $t_{sleep2}$ to correspond to an expected Wi-Fi COT, and if UE device 104 instead detects 5G interfering signals, UE device 104 may set time duration $t_{sleep2}$ to correspond to an expected NR COT.

Figure 11:
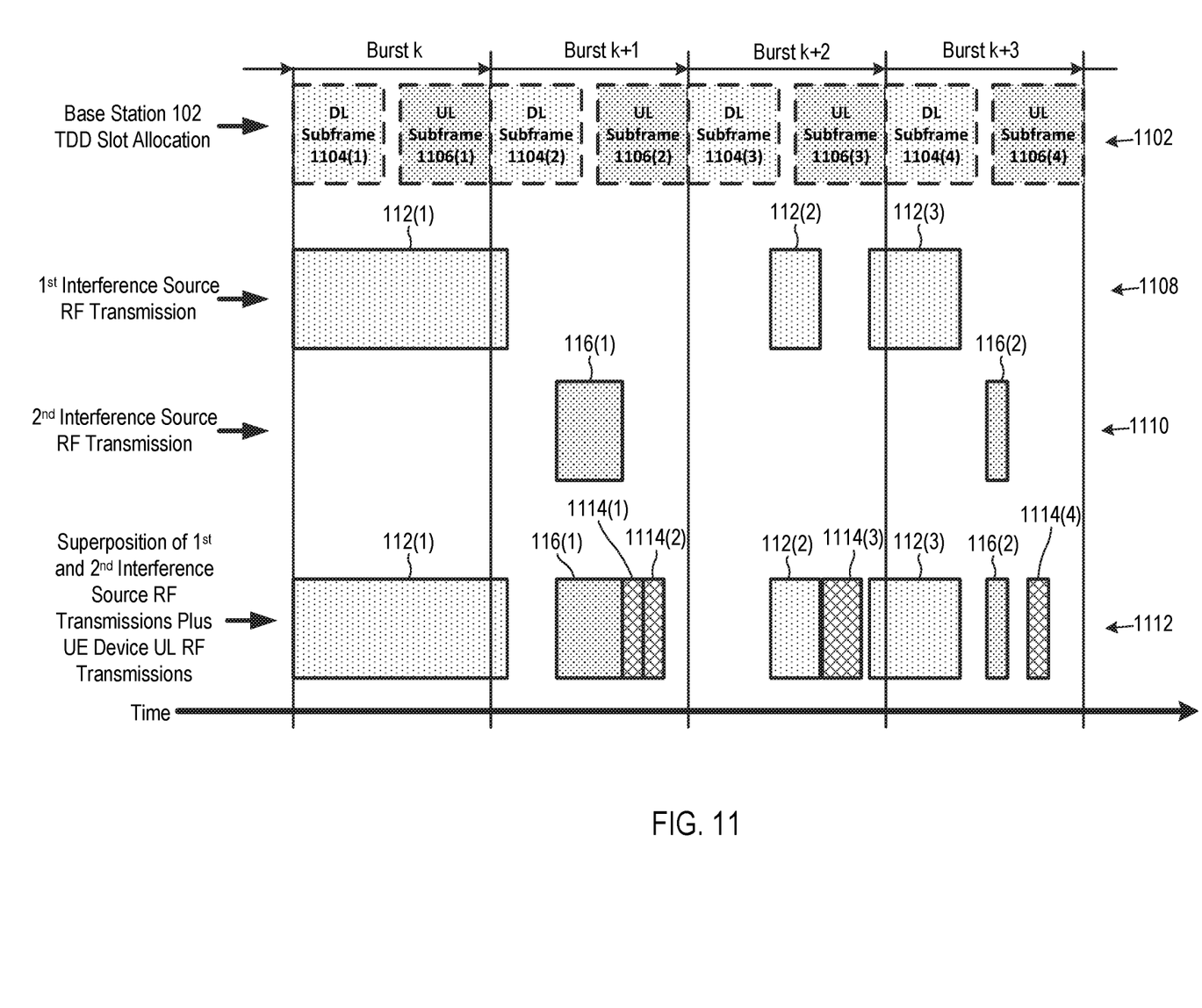
FIG. 11 is a timing diagram illustrating one example of a combination of the methods of FIG. 4 and FIG. 7.

FIG. 11 is a timing diagram illustrating one example of a combination of the methods of FIG. 4 and FIG. 7. Row 1102 of FIG. 11 illustrates downlink subframes 1104 and uplink subframes 1106 allocated by base station 102 to UE device 104 and any other UE devices operating in the same cell and connected to the same wireless system. Base station 102 multiplexes downlink subframes 1104 and uplink subframes 1106 in a time division duplex (TDD) manner. Row 1108 of FIG. 11 illustrates interfering RF transmissions 112 from interference source 108, which are detected by both base station 102 and UE device 104. Row 1110 illustrates interfering RF transmissions 116 from interference source 110, which are detected only by the UE (being hidden from base station 102). Row 1112 of FIG. 11 is a superposition of interfering RF transmissions 112 from interference source 108, interfering RF transmissions 116 from interference source 110, and uplink RF transmissions 1114 from UE device 104 to base station 102.

Base station 102 detects interfering RF transmissions 112, and base station 102 stops transmitting RF signals in response to detecting the COT information of the interference signals 1108. UE device 104 executes method 400 of FIG. 4 to operate in a sleep mode due to failure to receive control signals from base station 102, and UE device 104 therefore does not attempt uplink RF transmissions 1114 during presence of interfering signals 112 (following the COT detection signaled by the interfering RF transmissions 112; in one embodiment, this COT is signaled via a Wi-Fi preamble, which starts the burst 112(1)). Base station 102 does not detect interfering RF transmissions 116 due to presence of obstacle 118 (FIG. 1), but UE device 104 detects interfering RF transmissions 116, following a COT originated by the interference source 1110. In one embodiment, this COT is signaled by a Wi-Fi preamble positioned at the start of the bursts 112(1), 112(2) and 112(3). The UE device 104 executes method 700 of FIG. 7 to operate in a sleep mode in response to detecting interfering RF transmissions 116 and 112. UE device 104 transmits uplink RF transmissions 1114 during uplink subframes 1106 after performing a CCA to determine that the air interface is clear. Accordingly, execution of methods 400 and 700 in the example of FIG. 11 helps prevent interference between UE device 104 and interference sources 108 and 110. Additionally, execution of methods 400 and 700 optimizes the power consumption of UE device 104 by preventing transmission of uplink signals 1114 during presence of interfering RF transmissions 112 and 116 and therefore minimizing the battery power consumption of the UE.

Combinations of Features

Features described above may be combined in various ways without departing from the scope hereof. The following examples illustrate some possible combinations:

(A1) A method for detecting a channel occupancy time declared by an interfering device in a wireless communication system may include (1) receiving a first radio frequency (RF) transmission from a base station at a user equipment (UE) device, (2) detecting failure to receive a second RF transmission from the base station at the UE device, and (3) in response to detecting the failure to receive the second RF transmission from the base station, causing the UE device to operate in a sleep mode.

(A2) The method denoted as (A1) may further include causing the UE device to periodically wake from the sleep mode to detect a third RF transmission from the base station.

(A3) The method denoted as (A2) may further include waking the UE device in response to receiving the third RF transmission at the base station.

(A4) Any one of the methods denoted as (A1) through (A3) may further include operating the UE device in unlicensed radio frequency (RF) spectrum.

(A5) In any one of the methods denoted as (A1) through (A4), each of the first RF transmission and the second RF transmission may include one or more of (a) a fifth Generation (5G) New Radio (NR) Physical Downlink Shared Channel (PDSCh) and (b) a 5G NR Physical Downlink Control Channel (PDCCh).

(B1) A method for detecting channel occupancy time declared by an interfering device in a wireless communication system may include (1) receiving a first radio frequency (RF) transmission from a base station at a user equipment (UE) device, (2) detecting, at the UE device, an interfering RF transmission, and (3) in response to detecting the interfering RF transmission, causing the UE device to operate in a sleep mode.

(B2) The method denoted as (B1) may further include causing the UE device to periodically wake from the sleep mode to check for receipt of a second RF transmission from the base station.

(B3) The method denoted as (B2) may further include (1) receiving, at the UE device, the second RF transmission from the base station and (2) waking the UE device in response to a grant included in the second RF transmission.

(B4) Any one of the methods denoted as (B1) through (B3) may further include causing the UE device to wake at an end of a channel occupancy time (COT) associated with the interfering RF transmission.

(B5) Any one of the methods denoted as (B1) through (B4) may further include transmitting information from the UE device to the base station notifying the base station that the UE device has detected the interfering RF transmission.

(B6) In the method denoted as (B5), the information may be transmitted via a fifth Generation (5G) New Radio (NR) Physical Uplink Control Channel (PUCCh) message or a 5G NR Physical Random Access Channel (PRACh) message.

(B7) In any one of the methods denoted as (B1) through (B6), detecting the interfering RF transmission may include detecting an Institute of Electrical and Electronics Engineers (IEEE) 802.11 preamble in a signal received by the UE device.

(B8) The method denoted as (B7) may further include determining a channel occupancy time (COT) associated with the IEEE preamble comprised in the interfering signal.

(B9) In any one of the methods denoted as (B1) through (B8), detecting the interfering RF transmission may include detecting a fifth Generation (5G) New Radio (NR) signal from a different wireless communication system in a signal received by the UE device.

(B10) Any one of the methods denoted as (B1) through (B9) may further include operating the UE device in unlicensed radio frequency (RF) spectrum.

(B11) In any one of the methods denoted as (B1) through (B10), the first RF transmission may include one or more of (a) a fifth Generation (5G) New Radio (NR) Physical Downlink Shared Channel (PDSCh) and (b) a 5G NR Physical Downlink Control Channel (PDCCh).

(C1) A user equipment (UE) device may include (1) an antenna, (2) a transceiver communicatively coupled to the antenna, (3) a memory, and (4) a processor communicatively coupled to the memory, wherein the processor is configured to execute instructions stored in the memory to (a) receive a first radio frequency (RF) transmission from a base station at the UE device, (b) detect, at the UE device, an interfering RF transmission, and (c) in response to detecting the interfering RF transmission, cause the UE device to operate in a sleep mode.

(C2) In the UE device denoted as (C1), the processor may be further configured to execute instructions stored in the memory to cause the UE device to periodically wake from the sleep mode to check for receipt of a second RF transmission from the base station.

(C3) In any one of the UE devices denoted as (C1) and (C2), the processor may be further configured to execute instructions stored in the memory to cause the UE device to wake at an end of a channel occupancy time (COT) associated with the interfering RF transmission.

(C4) In any one of the UE devices denoted as (C1) through (C3), the processor may be further configured to execute instructions stored in the memory to cause the UE device to notify the base station that the UE device has detected the interfering RF transmission.

(C5) In any one of the UE devices denoted as (C1) through (C4), the processor may be further configured to execute instructions stored in the memory to detect the interfering RF transmission by detecting an Institute of Electrical and Electronics Engineers (IEEE) 802.11 preamble in a signal received by the UE device.

(C6) In the UE device denoted as (C5), the processor may be further configured to execute instructions stored in the memory to determine a channel occupancy time (COT) associated with the interfering RF transmission from the IEEE 802.11 preamble.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for detecting a channel occupancy time declared by an interfering device in a wireless communication system, comprising:
receiving a first radio frequency (RF) transmission from a base station at a user equipment (UE) device, in an active operating mode of the UE device;
detecting failure to receive an expected periodic second RF transmission from the base station at the UE device during a predetermined time frame; and
in response to detecting the failure to receive the expected periodic second RF transmission from the base station during the predetermined time frame, causing the UE device to change its operating mode from the active operating mode to a sleep operating mode and remain in the sleep operating mode until at least an expected next instance of the expected periodic second RF transmission.

2. The method of claim 1, further comprising causing the UE device to periodically wake from the sleep operating mode to detect the expected periodic second RF transmission from the base station.

3. The method of claim 2, further comprising waking the UE device in response to receiving the expected periodic second RF transmission at the base station.

4. The method of claim 1, further comprising operating the UE device in unlicensed radio frequency (RF) spectrum.

5. The method of claim 4, wherein each of the first RF transmission and the expected periodic second RF transmission includes one or more of (a) a fifth Generation (5G) New Radio (NR) Physical Downlink Shared Channel (PDSCh) and (b) a 5G NR Physical Downlink Control Channel (PDCCh).

6. A method for detecting channel occupancy time declared by an interfering device in a wireless communication system, comprising:
receiving a first radio frequency (RF) transmission from a base station at a user equipment (UE) device;
detecting, at the UE device, presence of an interfering RF transmission that may interfere with the UE device receiving further RF transmissions from the base station; and
in response to detecting presence of the interfering RF transmission, causing the UE device to operate in a sleep mode until at least an expected next RF transmission from the base station.

7. The method of claim 6, further comprising causing the UE device to periodically wake from the sleep mode to check for receipt of a second RF transmission from the base station.

8. The method of claim 7, further comprising:
receiving, at the UE device, the second RF transmission from the base station; and
waking the UE device in response to a grant included in the second RF transmission.

9. The method of claim 6, further comprising causing the UE device to wake at an end of a channel occupancy time (COT) associated with the interfering RF transmission.

10. The method of claim 6, further comprising transmitting information from the UE device to the base station notifying the base station that the UE device has detected the interfering RF transmission.

11. The method of claim 10, wherein the information is transmitted via a fifth Generation (5G) New Radio (NR) Physical Uplink Control Channel (PUCCh) message or a 5G NR Physical Random Access Channel (PRACh) message.

12. The method of claim 6, wherein detecting the interfering RF transmission comprises detecting an Institute of Electrical and Electronics Engineers (IEEE) 802.11 preamble in a signal received by the UE device.

13. The method of claim 12, further comprising determining a channel occupancy time (COT) associated with the IEEE preamble comprised in the interfering signal.

14. The method of claim 6, wherein detecting the interfering RF transmission comprises detecting a fifth Generation (5G) New Radio (NR) signal from a different wireless communication system in a signal received by the UE device.

15. The method of claim 6, further comprising operating the UE device in unlicensed radio frequency (RF) spectrum.

16. The method of claim 15, wherein the first RF transmission includes one or more of (a) a fifth Generation (5G) New Radio (NR) Physical Downlink Shared Channel (PDSCh) and (b) a 5G NR Physical Downlink Control Channel (PDCCh).

17. A user equipment (UE) device, comprising:
an antenna;
a transceiver communicatively coupled to the antenna;
a memory; and
a processor communicatively coupled to the memory, wherein the processor is configured to execute instructions stored in the memory to:
  receive a first radio frequency (RF) transmission from a base station at the UE device,
  detect, at the UE device, presence of an interfering RF transmission that may interfere with the UE device receiving further RF transmissions from the base station, and
  in response to detecting presence of the interfering RF transmission, cause the UE device to operate in a sleep mode until at least an expected next RF transmission from the base station.

18. The UE device of claim 17, wherein the processor is further configured to execute instructions stored in the memory to cause the UE device to periodically wake from the sleep mode to check for receipt of a second RF transmission from the base station.

19. The UE device of claim 17, wherein the processor is further configured to execute instructions stored in the memory to cause the UE device to notify the base station that the UE device has detected the interfering RF transmission.

20. The UE device of claim 17, wherein the processor is further configured to execute instructions stored in the memory to detect the interfering RF transmission by detecting an Institute of Electrical and Electronics Engineers (IEEE) 802.11 preamble in a signal received by the UE device.

* * * * *